Aug. 27, 1929.  J. BERGE  1,726,421

SPEEDOMETER DRIVING MECHANISM

Filed Jan. 8, 1923

Inventor
Joseph Berge
By his Attorneys
Blackmore, Spencer & Hicks

Patented Aug. 27, 1929.

1,726,421

UNITED STATES PATENT OFFICE.

JOSEPH BERGE, OF FLINT, MICHIGAN, ASSIGNOR TO A C SPARK PLUG COMPANY, OF FLINT, MICHIGAN, A CORPORATION OF MICHIGAN.

SPEEDOMETER-DRIVING MECHANISM.

Application filed January 8, 1923. Serial No. 611,458.

My invention relates to mechanism for driving the speedometer ordinarily used with motor driven vehicles, and particularly to speedometer driving devices wherein the shaft which drives the speedometer is itself driven from the main transmission or propelling shaft of the vehicle; usually from a position adjacent the rear end of the change speed transmission gearing casing with which motor driven vehicles are ordinarily equipped.

Motor driven vehicles are in practice equipped with various sizes of wheels and tires, whereas speedometers are usually adapted to register speed and distance traveled correctly only when used with a wheel and tire of one definite and assumed standard diameter. It therefore becomes necessary in equipping a vehicle with a speedometer to take into consideration the diameter of the wheels of the vehicle and to provide speed reduction gearing between the driving shaft of the vehicle and the shaft which drives the speedometer of proper speed ratio, and to use speed reduction gearing of a particular definite and proper ratio in connection with each particular size of vehicle wheel and tire, in order to insure the driving of the speedometer at such speed that it will register or indicate correctly.

The principal object of my invention is to provide a speedometer driving mechanism which may be more readily and conveniently adapted for use with various sizes of vehicle wheels and tires than has heretofore commonly been the case, the mechanism being of such construction that the size of driving pinion necessary in each particular case (dependent upon the diameter of the wheels of the vehicle) may be readily incorporated therein; to thereby secure the driving of the speedometer at the speed at which it is designed to be driven and at the speed at which it will indicate the speed and distance traveled correctly.

A further object of my invention is to provide speedometer driving mechanism of the class or type above referred to and wherein means are provided for definitely positioning the parts relative to one another, and whereby said parts cannot be assembled incorrectly; so that when the parts are properly assembled they will be held in permanent and definite relation relative to one another to secure a proper driving of the shaft through which the speedometer is driven.

The drawing accompanying and forming a part of this specification illustrates the preferred embodiment of my invention; although it will be appreciated that the same may be embodied in other forms, and that my invention includes all such modifications of the particular form illustrated as come within the scope of the concluding claims.

Referring now to the drawing.

Figure 1:
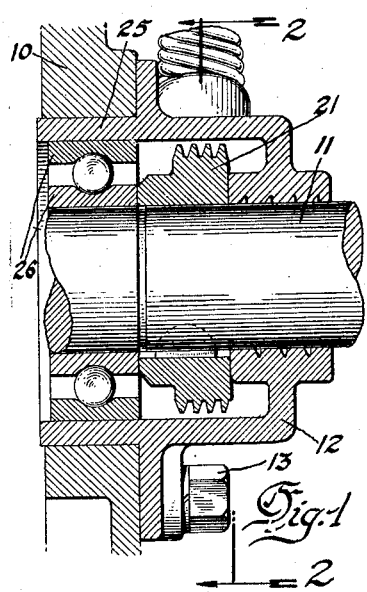
Figure 1 is a fragmentary sectional view showing my improved speedometer driving mechanism associated with the change speed gearing casing of a motor driven vehicle, this view being upon a vertical longitudinally extending plane indicated by the line 1—1, Figure 2.

Referring now to the drawing, the reference numeral 10 designates the rear end wall of the usual change speed transmission gearing casing employed in motor vehicles for housing the gears whereby variation in speed of the vehicle is secured; and 11 designates the main driving or propeller shaft of the vehicle which extends through an opening in the wall 10 thereof and rearward from said casing, and is operatively connected with the rear driving wheels of the vehicle through any suitable mechanism.

Figure 2:
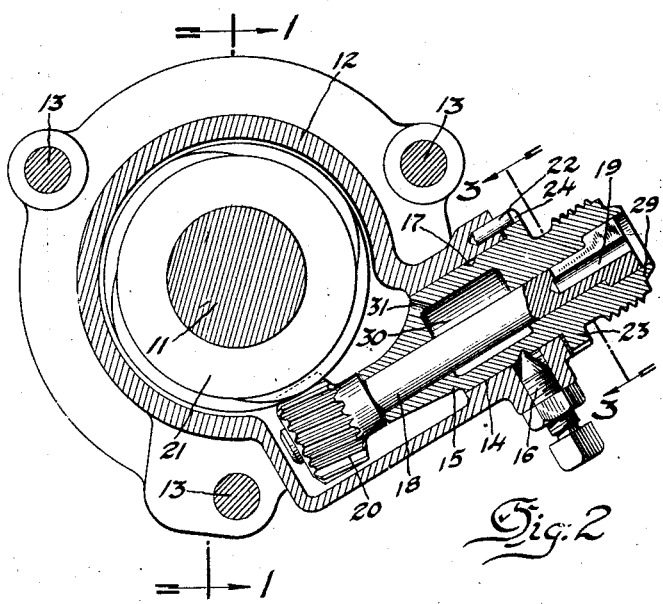
Figure 2 is a view showing a section upon a vertical transverse plane indicated by the line 2—2, Figure 1.
Figure 3:
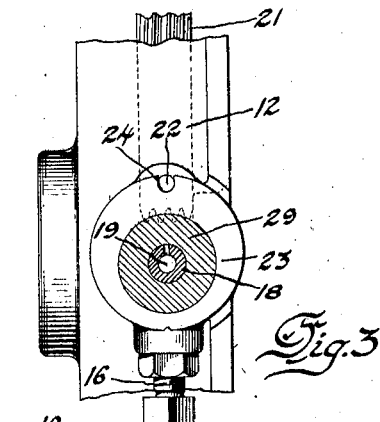
Figure 3 is a view showing a section upon an inclined plane indicated by the line 3—3, Figure 2.
Figure 4:
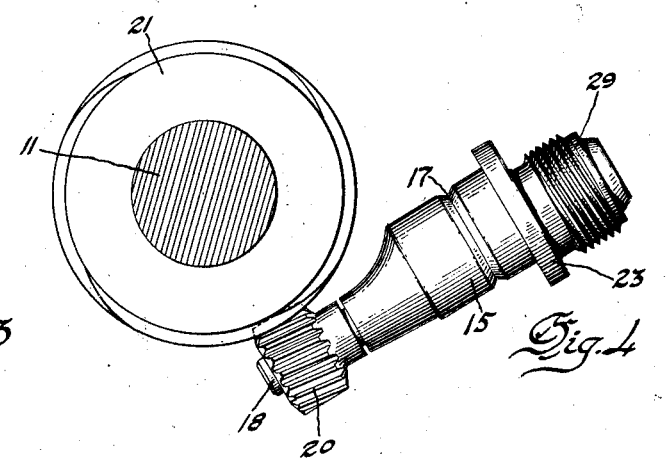
Figure 4 is a fragmentary view showing the gear members and spindle supporting sleeve of my improved driving mechanism apart from the other elements thereof.

The reference numeral 12 designates a hollow housing arranged adjacent the rear wall 10 and ordinarily secured thereto as by bolts 13 extending through holes provided in a flange of the housing; which housing surrounds the shaft 11, as will be appreciated. This housing, as best shown in Figure 2, is provided with a cylindrical opening 14 the axis of which extends transverse to the axis of the shaft 11; and the reference numeral 15 designates a spindle supporting sleeve having a cylindrical portion fitting within the opening 14 so that the sleeve as a whole may be rotated within the said opening. A set screw 16 is commonly provided for holding the sleeve in place within the opening, the inner end of said set screw being pointed and entering into a groove 17 provided in the peripheral wall of the cylindrical portion of the sleeve.

The sleeve is provided with a longitudinally extending bearing the axis of which is offset relative to the axis of the opening 14, and within which bearing a spindle 18 is rotatably supported; the outer end of said spindle having any suitable form of recessed or key slot connection 19 whereby the end of a flexible speedometer driving shaft may be operatively connected with the spindle so that the same will act to drive the shaft. The inner end of this spindle carries a pinion 20 which meshes with a spiral gear 21 upon the shaft 11; these elements obviously providing speed reducing gearing through which the spindle is driven from the driving shaft and through which gearing and spindle the speedometer is driven through a suitable flexible shaft as is usual in speedometer driving mechanism.

Because of the offset arrangement of the axis of the spindle 18 relative to the axis of the opening 14 it will be appreciated that pinions corresponding with the pinion 20, but of different diameters, may be caused to engage properly with the spiral gear 21 to thereby provide for different speed ratios between the said gear and the spindle which it drives, and for the driving of the speedometer driving shaft at such speed as may be necessary in each particular case to secure a proper indication of the speed and of the distance traveled, in the case of a vehicle having any particular diameter of wheel and tire.

Figure 6:
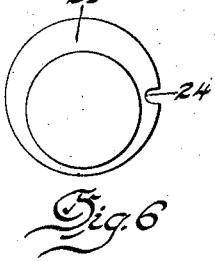
Figures 6, 7 and 8 are views showing a feature of my invention whereby provision is made for changing the speed ratio of the gearing thereof, and whereby the position of the spindle carrying sleeve which supports the pinion spindle of the device is fixed and determined when the parts are assembled.
Figures 7, 8:
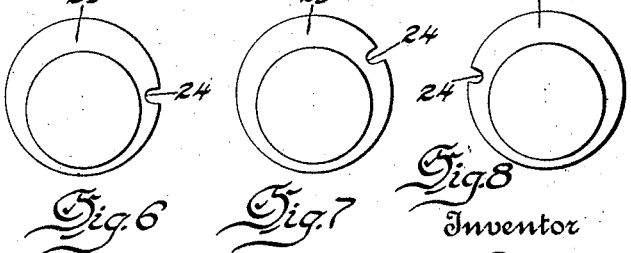

In practice spindles having such diameters of pinion corresponding with the pinion 20, as may be necessary to secure proper speed of the speedometer driving shaft when the instrument is used in connection with various sizes of wheels, will be assembled with sleeves 15 any one of which may be assembled with a housing to complete a driving mechanism; so that in making up a driving mechanism it will simply be necessary to select a sleeve having the proper size of pinion assembled therewith and introduce the same into the opening 14 and fasten it in place. In order, however, to avoid the necessity of adjusting the sleeve in each particular case so as to secure proper meshing of the gear and pinion the housing and sleeve are provided with cooperating stop members which prevent the parts from being incorrectly assembled, and which insure that when the sleeve is in place within its opening the pinion which it carries will mesh properly with the spiral gear 21, which stop members may take various forms. In the embodiment of my invention illustrated, however, this positioning of the parts is accomplished by providing the housing with a stop in the form of a pin 22, and by providing a collar 23 upon the sleeve 15; said collar being provided with a notch 24 which engages the pin, as shown in Figure 2, and which positions the parts angularly and definitely relative to one another. Sleeves adapted for use with various sizes of pinion like the pinion 20 will have their slots 24 differently positioned, as indicated in Figures 6, 7 and 8, so that a sleeve the spindle of which has a pinion of the proper diameter for use with a given diameter of vehicle wheel can be assembled in one position only relative to the housing, in which position the pinion will mesh properly with the spiral gear which drives it and the spindle will be driven at the proper speed for securing correct reading of the speedometer when used upon a vehicle having wheels of the diameter for which the particular pinion contemplated is adapted for use.

Figure 5:
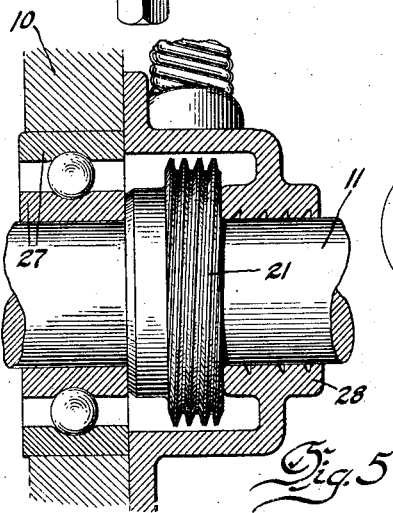
Figure 5 is a view similar to Figure 1 but showing a slightly modified form of my invention.

In the form of my invention illustrated in Figure 1 the housing 12 is provided with an inwardly extending sleeve 25 which fits into an opening of proper diameter in the end wall 10 of the transmission gearing casing, and within which sleeve a bearing 26 for the driving shaft 11 is arranged. In the form of my invention illustrated in Figure 5, however, the corresponding bearing 27 is supported directly within an opening provided in the rear wall of the transmission casing; in which case the housing 28 has no cylindrical extension corresponding with the extension 25, but fits flat against the outer surface of said end wall, as clearly shown in said figure.

The sleeve 15 is provided with a threaded nipple portion 29 at its free end (see Figure 2) with which the end of the stationary outer casing or sheath of the driving shaft is connected; the casing being non-rotatable and the shaft which drives the speedometer extending therethrough, and being driven from the spindle 18 through the key connection 19, as will be appreciated.

It will be appreciated that the spiral gear 21 is of sufficient width to insure the driving of whatever pinion may be used upon the inner end of the spindle 18 notwithstanding such slight variations in positions of spindles (longitudinally of the driving shaft 11) as may be due to different angular adjustments of the sleeve within the opening 14, which lateral displacements obviously occur in the use of pinions of various sizes. Also, while I have referred to the sleeve 15 merely as having a bearing for the spindle 18 I prefer to employ a bearing having an internal enlargement or recess 30, thus in effect providing two bearings in the sleeve, one at each side of said recess. This recess is placed in communication with the interior of the housing through a passage 31 in order that oil which will naturally pass through the bearings 26, 27 and into the interior of the housing may, in addition to lubricating the gear 21 and pinion 20, find its way into the said chamber to thereby also accomplish the lubrication of the spindle.

Having thus described and explained my invention, I claim and desire to secure by Letters Patent:

1. In combination with a transmission gearing casing having a wall through which the main driving or propeller shaft of the vehicle extends, and a housing surrounding said shaft and arranged adjacent said wall and which housing is provided with a cylindrical opening the axis of which extends transverse to said driving shaft; a sleeve circular in cross section arranged within said opening and extending transverse to said shaft; a spindle rotatable in a bearing provided within said sleeve, and which bearing is offset relative to the axis of said sleeve and the axis of the opening aforesaid; gearing through which said spindle is driven from said shaft; means whereby and through which the stationary casing and the rotatable driving member therein, of a speedometer driving shaft may be connected with the outer end of said sleeve and spindle; cooperating members carried one by said housing and another by said sleeve, and which members are adapted to engage one another to thereby hold said sleeve in one definite and fixed position relative to said housing; and means for holding said sleeve in place within the opening aforesaid and said cooperating members in engagement with one another.

2. In combination with a transmission gearing casing having an end wall, and with the main driving or propeller shaft of the vehicle extending from said casing and through said end wall; a housing surrounding said shaft and secured to said end wall, and which housing is provided with a cylindrical opening the axis of which extends transverse to said driving shaft; a gear carried by said shaft and located within said housing; a spindle supporting sleeve circular in cross section arranged within said opening and extending transverse to said shaft, and the outer end of which sleeve is threaded; a spindle rotatable in a bearing provided in said sleeve and the axis of which is offset relative to the axis of said opening, and which spindle is provided with a driving recess at its outer end; a pinion upon the inner end of said spindle and with which the gear aforesaid meshes; a stop carried by said housing; a flange carried by said sleeve and having a recess therein into which said stop may enter when the parts are properly positioned, to thereby hold said sleeve in one definite and predetermined angular position relative to said housing; and means for holding said sleeve in place within the opening aforesaid and said recess in engagement with said stop.

In testimony whereof I affix my signature.

JOSEPH BERGE.